Nov. 10, 1959   E. C. L. DE FAYMOREAU   2,912,689
RADIO NAVIGATION SYSTEM
Filed Aug. 16, 1957   3 Sheets-Sheet 1
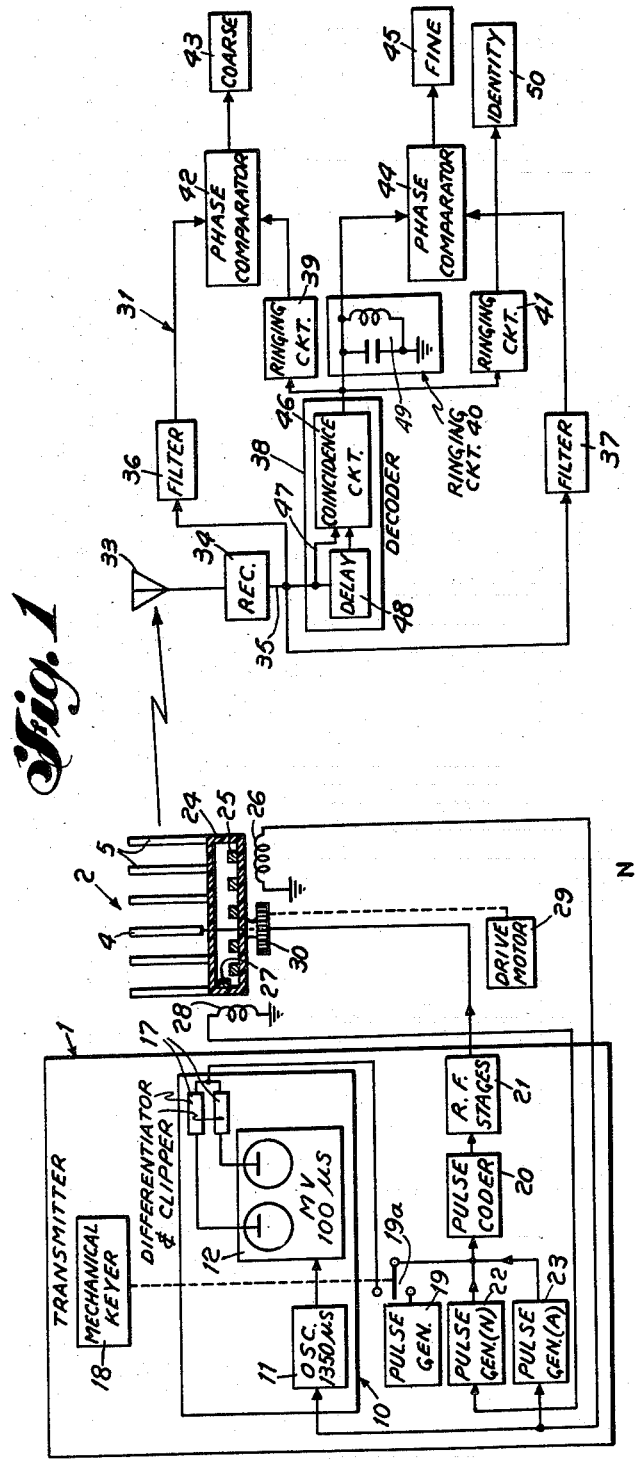
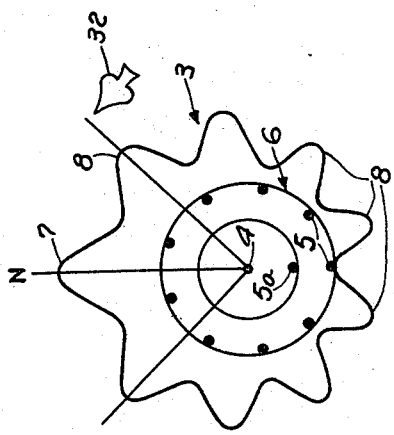
Inventor
ETIENNE C. L. de FAYMOREAU
By Philip M. Bolton
Attorney Inventor
ETIENNE C. L. de FAYMOREAU By Philip M. Bolton
Attorney Nov. 10, 1959  E. C. L. DE FAYMOREAU  2,912,689
RADIO NAVIGATION SYSTEM
Filed Aug. 16, 1957  3 Sheets-Sheet 3

Inventor
ETIENNE C. L. de FAYMOREAU
By Philip M. Bolton
Attorney

United States Patent Office 2,912,689
Patented Nov. 10, 1959

2,912,689

RADIO NAVIGATION SYSTEM

Etienne C. L. de Faymoreau, Nutley, N.J., assignor to International Telephone and Telegraph Corporation, Nutley, N.J., a corporation of Maryland Application August 16, 1957, Serial No. 678,715

5 Claims. (Cl. 343—106)

This invention relates to a radio navigation system of the type in which a radio beacon periodically emits identifying signals.

In certain radio navigation systems, such as TACAN, bearing information is provided by a beacon station which radiates pulses according to rotating multi-lobed directional pattern. Each time a lobe of this pattern passes a given reference point, a reference signal is emitted. The rotation of the antenna pattern, in effect, amplitude modulates the pulses to provide an amplitude envelope thereon. The phase of this envelope with respect to the reference signals varies at different azimuthal angles from the beacon. In a receiver receiving these pulses from the beacon station, this envelope is separated from the pulses by a filter and the phase of this envelope is compared with the phase of the reference signals to give the bearing indication.

In the TACAN system the usual pulses produced are semi-random in nature, that is, there are approximately 2700 pulses per second but the pulse positions are not fixed. These semi-random pulses are encoded by sending a pair of pulses for each one of the semi-random pulses with a fixed spacing between the pulses of each pair. Heretofore it has been the practice in the TACAN system to also produce an identifying signal of a like number of pulses per second, that is, 2700 pulses per second, but these pulses are of fixed regular spacing and are used at the receiver to ring a ringing circuit and produce a tone which is keyed at the beacon in accordance with a code identifying that beacon station. When the identifying tone pulse signals are transmitted in place of the semi-random pulses, they, too, are effectively amplitude modulated according to the rotating antenna radiation pattern. It has been found, however, that the bearing information obtained from the envelope of the fixed tone pulses is shifted with respect to that from the envelope of the semi-random pulses. This is due to the fact that in the filter, amplitude modulated pulses of equal spacing and of fixed repetition rate will produce an output envelope of one phase, and that similarly amplitude modulated pulses equal in number per second but of a semi-random nature will produce an output envelope relatively shifted in phase.

In providing an identifying tone signal in the form of pulses, certain requirements must be met in the TACAN system. In the first place, in order to produce an identifying tone, the pulses must have a regular repetition pattern so that they can ring a ringing circuit which will be relatively unaffected by the semi-random pulses normally transmitted. In the second place, in order to maintain a relatively constant duty cycle, the number of pulses generated during the identifying tone signal should be approximately equal to the number of semi-random pulses. In the third place, as pointed out hereinbefore, it is important that when the identifying tone pulses are amplitude modulated, the envelope derived by the filter at the receiver of the mobile station should be shifted in phase as little as possible with respect to the envelope derived when the pulses are semi-random.

An object of the present invention is the provision of an improved radio navigation system providing identifying signals.

Another object of the present invention is the provision in a radio navigation system of identifying signals which also carry bearing information, which identifying signals provide said information with increased accuracy over prior systems.

A further object of the present invention is the provision in a navigation system where bearing information is obtained by comparing the amplitude modulation of pulses with reference pulse signals, of an arrangement to derive accurate bearing information using fixed identity tone pulses interspersed between the usual semi-random pulses carrying the bearing information.

In accordance with a feature of the present invention, the identifying tone pulses are pairs of pulses with the pulses of each pair being close together, while the spacing between adjacent pairs are further apart.

Other and further objects of the present invention will become apparent and the foregoing will be better understood with reference to the following description of an embodiment thereof, reference being had to the drawings, in which:

Fig. 1 is a simplified block diagram of a TACAN type beacon transmitter and mobile receiver;

Fig. 2 is a diagram of the radiation pattern of the antenna of the beacon;

Figure 3:
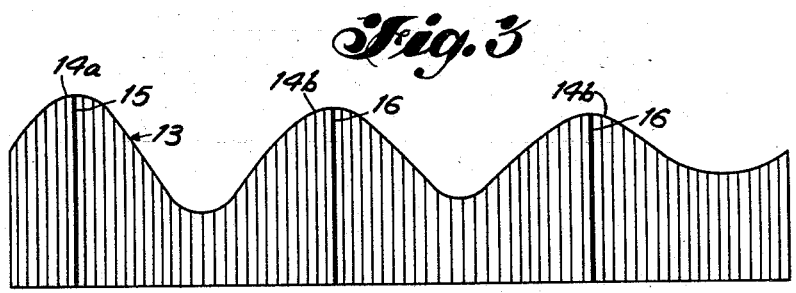
Fig. 3 is a curve showing qualitatively the effective amplitude modulation envelope of the pulses transmitted from the beacon.

Referring now to Fig. 1, a beacon station 1 emits pulses from its rotating antenna according to a multilobed directional pattern 3, as shown in Fig. 2. The pattern is rotated at the rate of 15 cycles per second. The antenna system may consist of a central omnidirectional antenna 4 with passive reflectors 5 spaced thereabout at 40 degree separations and a single reflector 5A the reflectors being, for example, printed on a pair of cylinders 6 which rotate around central radiator 4, the pattern consisting of a major lobe 7 or directional configuration produced by 5A with nine minor lobes 8 produced by reflectors 5 spaced every 40 degrees.

The semi-random pulses 9 (see Fig. 3) are generated by a pulse generator 19 in the beacon which may be, for example, a free running multivibrator. These pulses 9 (Fig. 3) are generated at about 2700 per second before transmission is applied to a pulse coder 20 which changes each single pulse into a pair of pulses spaced 12 microseconds. The pulses from pulse coder 20 are used to key or modulate an R.-F. oscillator in an R.-F. section 21 which may also include amplifier stages. The R.-F. pulses are then fed to the antenna system 2 from whence they are emitted according to the directional pattern 3 of Fig. 2. The rotation of the antenna reflectors, in effect, produces an amplitude modulation envelope 13 (Fig. 3) on the pulses with a maximum amplitude peak 14A corresponding to the maximum lobe 7, and the other peaks 14B corresponding to the minor lobes 8. The multilobed antenna pattern which is rotating at 15 c.p.s. produces a modulation envelope of 135 c.p.s (9 lobes multiplied by 15 c.p.s.) on top of the fundamental of 15 c.p.s. The phase of this envelope varies at different azimuthal angles from the beacon stations.

As the antenna system 2 rotates so that major lobe 7 passes a given reference direction, such as, for example, north, a reference pulse signal is emitted which is called hereinafter the "main" or "north" reference signal. The north signal may be produced by pulse generator 22 which produces 12 pulses separated by 30 microseconds, which pulses are applied to the pulse coder 20 thereby producing 12 pulse pairs or 24 pulses with the spacing between the pulses of the pairs being 12 microseconds. While the north signal 15 is shown as a solid black line in Fig. 3, it actually consists of the aforementioned pulse group.

As each minor lobe 8 passes the reference direction, remembering that the minor lobes are spaced by 40 degrees from each other, an "auxiliary" reference signal 16 is emitted. The auxiliary signal 16 may be generated by generator 23 which produces a burst of 6 pulses spaced 24 microseconds apart from leading edge to leading edge. Pulses from generator 23 are fed into the pulse coder 20 where the 6 pulses are then doubled to become 6 pairs of pulses or 12 pulses with a 12 microsecond spacing between adjacent pulses. Generators 22 and 23 may consist of conventional pulse generators feeding tapped delay lines or ringing circuits to produce the desired number of pulses with the proper spacing for the main or auxiliary reference groups as described above.

The identity tone signal is generated by a pulse generator 10 in the beacon which may be, for example, a plate-coupled Hartley oscillator 11 feeding a one shot multivibrator 12, having a period of oscillation of 100 microseconds. Output pulses from each anode are differentiated and clipped in differentiator and clipper 17 and combined to provide two pulses of the same polarity and spaced at 100 microseconds for each cycle of the oscillator 11. A mechanical keying device 18 keys pulse generator 10 with the prearranged Morse code signal which identifies the transmitting radio beacon. The pulse generator 10 when keyed on produces corresponding trains of pulse pairs in accordance with a letter in Morse code. These pulses are then applied to a pulse coder 20 through switch 19A, which changes each single pulse into a pair of pulses spaced 12 microseconds between the pulses of each pair. These identity tone signals are transmitted at regular intervals. The pulses from coder 20 are used to key or modulate R.-F. oscillator or amplifier stages 21, and the R.-F. pulses are then fed to the antenna system from whence they are emitted according to the directional pattern 3 of Fig. 2. A switch 19A is mechanically controlled, as for example by the mechanical keyer 18, so that whenever identity signals are being transmitted the random pulse generator 19 is disconnected and the identity pulse generator 10 is connected to the pulse coder 20.

Suitable timing means which can take any one of the various forms well known in the art is associated with the antenna system 2 and pulse generators 22 and 23 to cause the north and auxiliary signal to be emitted at the proper time. For example, a pulser plate 24 may be provided at the bottom of the antenna arrangement 2 having a number of soft iron slugs 25 equal in number to the number of minor lobes and spaced therearound. Pickup coil 26 is positioned so that as each of the slugs passes it, a pulse is produced. These pulses are used to trigger pulse generator 23 and also synchronize the plate-coupled Hartley oscillator 11 of pulse generator 10 with the antenna rotation. A single slug 27 is also positioned on the periphery of the pulser plate 24 and operates with a separate pickup coil 28 to produce pulses to trigger the north or main pulse generator 22. A driving motor 29 is used to rotate the antenna system through a suitable gear train 30.

The emitted pulses are received on a receiver 31 located in a mobile vehicle 32 (Fig. 2) such as, for example, an airplane. The signal is picked up on an omnidirectional antenna 33 and fed to the receiver 34 which removes the R.-F. envelope and detects the signal. The output of the receiver 34 is fed via line 35 to two filters, 36 and 37, filter 36 being arranged to separate the fundamental (15 cycles per second) component of the amplitude modulation envelope, which is the component produced by the major lobe for each rotation, and filter 37 being tuned to 135 cycles per second to select the harmonic (40 degree minor lobe) components. The output of receiver 34 is also applied to a decoder 38 which produces an output pulse for each input pulse spaced 12 microseconds from a prior input pulse. The output of the decoder 38 is then fed to a north signal separation circuit 39, an auxiliary signal separation circuit 40 and an identity pulse signal separation circuit 41. The separated north signal is compared in a phase comparator 42 with the 15 cycle-per-second wave output of filter 36 and depending upon this comparison, a coarse indication of bearing of the receiver with respect to the beacon is obtained on coarse indicator 43. A second phase comparison circuit 44 compares the phase of the 135 cycle-per-second wave in filter 37 with the separated auxiliary signal and produces a fine indication within a 40 degree sector, the rough indication produced by the phase comparator 42 indicating which 40 degree sector is referred to by the fine indicator 45.

As shown in simplified form, the decoder 38 consists essentially of a coincidence circuit 46 to which the input pulses are fed directly along line 47, the pulses likewise being fed to a coincidence circuit 46 through a delay device 48 having a delay of 12 microseconds. The coincidence circuit 46 produces an output when a delayed pulse coincides with an input pulse directly applied thereto. Various other arrangements for decoding by the delay of one pulse with respect to the other will occur to those versed in the art.

The north pulse separator 39, the auxiliary pulse separator 40 and the identity tone pulse separator 41 all include ringing circuits 49. The ringing circuit of the north signal separator 39 is tuned to approximately 30 kilocycles to respond to the north signal pulses, which are separated by 30 microseconds. The auxiliary pulse ringing circuit 40 is tuned to approximately 80 kilocycles to respond to the auxiliary pulses as obtained from the decoder 38, which are separated by 12 microseconds. The identity tone ringing circuit 41 is tuned to approximately 1350 cycles per second to respond to the identity tone pulses which are separated by 100 microseconds and these pulses are fed into an identity tone indicator 50. Pulses whose spacing does not correspond to the repetition frequency to which the various ringing circuits are tuned will not produce oscillations of sufficient amplitude to produce a false indication.

Figure 4:
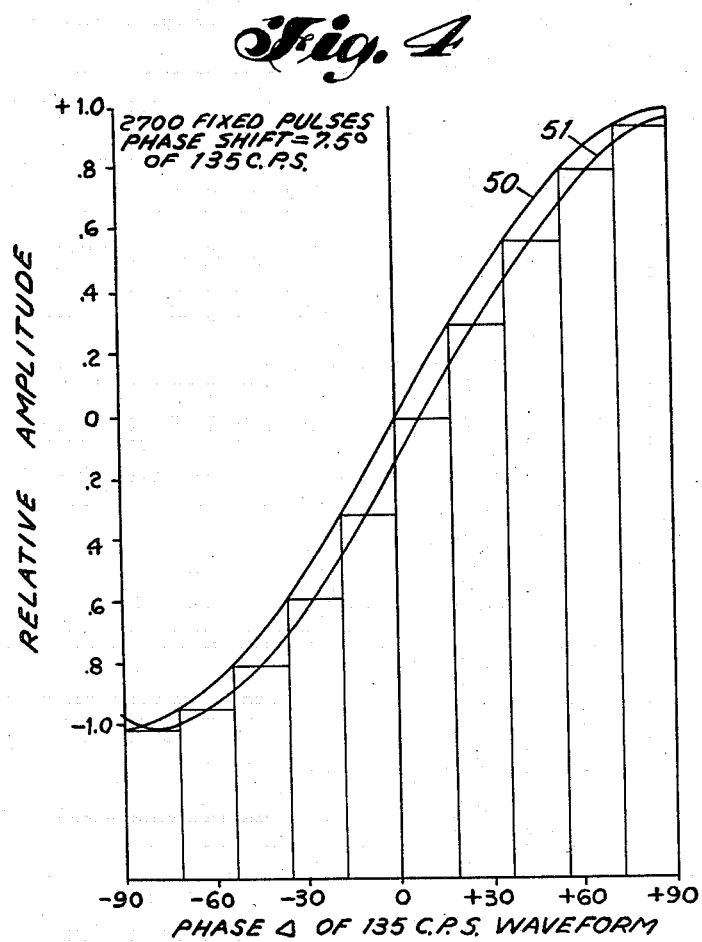
Fig. 4 is a curve illustrating equally spaced pulses transmitted at a fixed pulse repetition frequency and the resultant wave derived from the filter.
Figure 6:
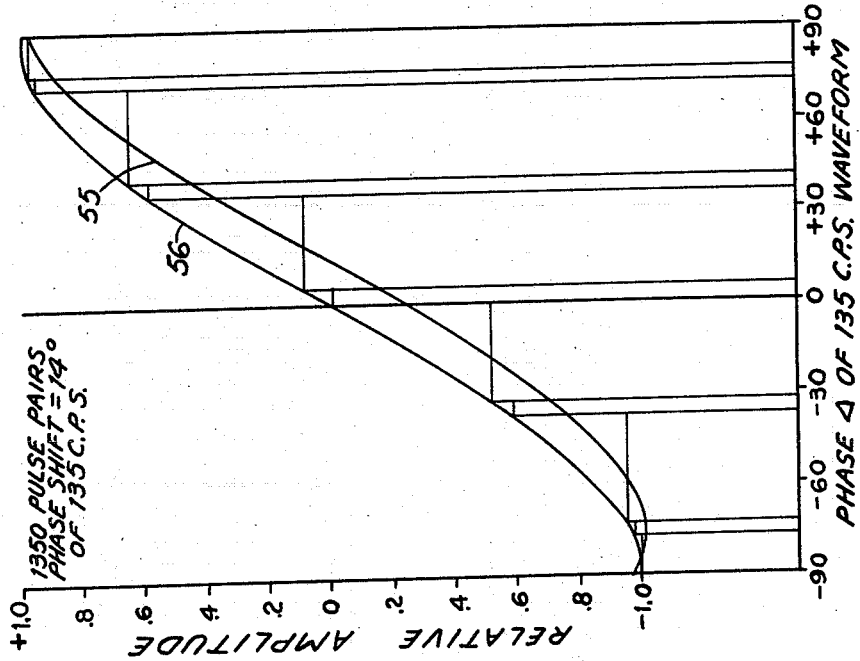
Fig. 6 is a curve showing the fixed pulses transmitted at a fixed pulse repetition frequency with each alternate pulse advanced, and the resultant wave derived from the filter.
Figure 5:
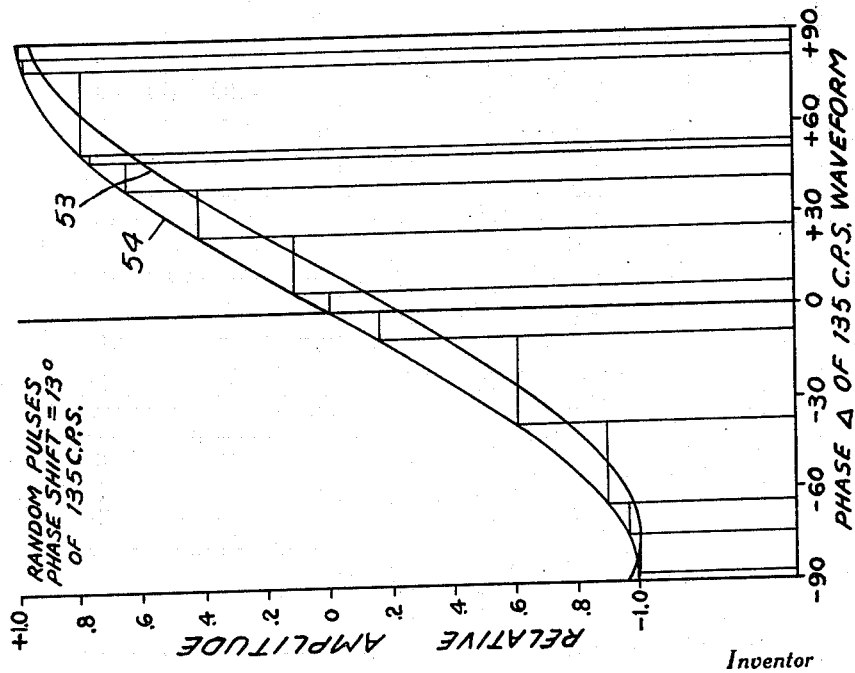
Fig. 5 is a curve showing semi-random pulses, and the resultant wave derived from the filter.

Figs. 4 through 6 illustrate the principles of the filtering action upon the pulses which are received at different repetition frequency rates. The time taken for filters 36 and 37 to build up information contained in the amplitude modulation of pulses depends upon the number of pulses present. Thus, the phase of a wave derived from a filter will change with the pulse repetition frequency, for example, the phase of the derived wave will lag if the pulse repetition frequency is decreased. The foregoing phenomena is illustrated in the curves of Figs. 4 through 6. Fig. 4 shows the identity tone signal pulses which were formerly transmitted at a fixed pulse repetition frequency of 2700 pulses per second, and the resultant wave 51 derived from the filter. With respect to the pulse envelop 52 the resulting phase shift due to the filter was approximately 7½ degrees. Fig. 5 illustrates the transmission of semi-random pulses, and the resultant wave 53 derived from the filter. With respect to the pulse envelope 54, it can be seen that the lag of the wave derived from the filter using semi-random pulses is approximately equal to 13 degrees or nearly twice as large as compared to the lag of the wave derived from the filter using fixed pulses (Fig. 4). Fig. 6 shows pulses transmitted at a fixed pulse repetition frequency with each alternate pulse advanced, and the resultant wave 55 derived from the filter. As can be seen, the resulting phase shift with respect to the pulse envelope 56 is approximately equal to 14 degrees. In TACAN, a random pulse rate is ordinarily used. When, however, the beacon is to send out an identifying signal, the pulse separation is fixed so as to ring a tuned circuit which thereby produces an identity tone. Even though the identity signals are being transmitted, it is a requisite that the bearing information be not disturbed. The bearing information on the receiver of the mobile unit is obtained by comparing a wave derived from the incoming pulses through filters 36 and 37 with a wave generated under the control of the reference pulses. It will be clear that if the wave derived from the filters is shifted in phase, it will introduce error in the bearing indication, and this shift in phase will occur when the modulated pulses are changed from semi-random occurrence to fixed occurrence. To avoid this difficulty, it has been found that if the identification pulse signals are transmitted at 1350 pairs of pulses per second, as illustrated in Fig. 6, that the phase lag of the wave derived from the filter using these fixed pairs of pulses will be approximately equal to the lag of the wave derived from the filter using semi-random pulses (Fig. 5). The 1350 pairs of pulses are transmitted so that the pulses of each pair are close together, while the spacing between adjacent pairs is further apart. For example, the fixed pulse of one pair is spaced from the fixed pulse of the next pair by 100 microseconds measuring from one leading edge to the other leading edge, while the spacing between the pulses of any pair is 12 microseconds.

As described hereinbefore, the tone pulses are arranged to be in pairs. Of course it will be seen that instead of using such pairs of pulses, triple pulses, or quadruple pulses, etc. may be grouped together. However, the paired arrangement is simplest and therefore generally preferable.

While I have described above the principles of my invention in connection with specific apparatus, it is to be clearly understood that this description is made only by way of example and not as a limitation to the scope of my invention set set forth in the objects thereof and in the accompanying claims.

I claim:
1. A radio navigation system providing special signals, comprising means for generating a train of semi-random pulses with a given average number of pulses per second, means for generating fixed pairs of pulses with a spacing between pulses of each pair less than the spacing between the second pulse of each pair and the first pulse of the next pair, the total number of pulses of said pairs equaling said average pulse rate, means for transmitting all of said pulses according to a directional rotating antenna pattern, means for transmitting reference signals fixed in phase with respect to said antenna pattern rotation; and a receiver for receiving said signals, filter means for deriving an envelope wave from the resultant amplitude modulated pulses, means for comparing said envelope wave with said reference signals to produce a bearing indication, and means for deriving said special signals from said pulse pairs.

2. A radio navigation system according to claim 1, wherein said means for deriving special signals comprises a ringing circuit tuned to a frequency equal to the repetition frequency of said pairs of pulses.

3. A radio navigation system according to claim 1, wherein said pulse pair generating means includes a frequency controlled oscillator, a multivibrator coupled to the output of said oscillator and triggered thereby, and means coupled to said multivibrator for deriving a pair of pulses therefrom in response to each cycle of said oscillator.

4. A radio navigation system according to claim 3, wherein said oscillator has a predetermined fixed repetition frequency and wherein said means for deriving special signals includes a ringing circuit tuned to said predetermined fixed repetition frequency.

5. A radio navigation system providing identifying tone signals comprising means for generating a train of semi-random pulses with a given average number of pulses per second, means for generating a train of fixed tone pulses having the same number of pulses per second as said given average number, with one set of alternate equally spaced tone pulses advanced in time with respect to the other set of alternate equally spaced tone pulses, means for alternatively transmitting one of said trains according to a multi-lobed rotating antenna pattern, means for transmitting reference signals fixed in phase with respect to said antenna pattern rotation; and a receiver for receiving said signals, filter means for deriving an envelope from the resultant amplitude modulated pulses, means for comparing said envelope wave with said reference signals to produce a bearing indication, and means for deriving an identifying tone signal from said train of identifying tone pulses.

References Cited in the file of this patent
UNITED STATES PATENTS
2,815,507     De Faymoreau _____ Dec. 3, 1957